United States Patent
Zhang et al.

(10) Patent No.: US 9,468,045 B2
(45) Date of Patent: Oct. 11, 2016

(54) HEATING DEVICE FOR COMPLEXLY FORMED SURFACES

(75) Inventors: Jonathan Yu Zhang, Tianjin (CN); Yand Yanbing Zhang, Hebei Province (CN); Fred Fufei Zhang, Hebei Province (CN); Beck Hailong Liang, Heibei Province (CN)

(73) Assignee: GENTHERM GMBH, Odelzhausen (DE)

( * ) Notice: Subject to any disclaimer, the term of this patent is extended or adjusted under 35 U.S.C. 154(b) by 731 days.

(21) Appl. No.: 13/432,210

(22) Filed: Mar. 28, 2012

(65) Prior Publication Data

US 2012/0255944 A1    Oct. 11, 2012

(30) Foreign Application Priority Data

| Apr. 6, 2011 | (DE) | 10 2011 016 254 |
| May 20, 2011 | (DE) | 10 2011 102 719 |
| Dec. 15, 2011 | (DE) | 10 2011 121 147 |
| Dec. 23, 2011 | (DE) | 10 2011 122 134 |
| Jan. 20, 2012 | (DE) | 10 2012 000 977 |

(51) Int. Cl.
- *H05B 1/02* (2006.01)
- *H01R 43/00* (2006.01)
- *H05B 3/34* (2006.01)

(52) U.S. Cl.
CPC .............. *H05B 3/345* (2013.01); *H05B 3/347* (2013.01); *H05B 2203/004* (2013.01); *H05B 2203/007* (2013.01); *H05B 2203/015* (2013.01); *H05B 2203/029* (2013.01); *Y10T 29/49117* (2015.01)

(58) Field of Classification Search
CPC .................. H05B 2203/004; H05B 2203/007; H05B 2203/029; H05B 3/345; H05B 3/347

USPC ....... 219/202, 204, 209, 528, 529, 494, 542, 219/546, 549

See application file for complete search history.

(56) References Cited

U.S. PATENT DOCUMENTS

| 1,475,912 A | 11/1923 | Williams |
| 1,553,461 A | 9/1925 | Negromanti |
| 1,615,635 A | 6/1927 | Kuno |
| 2,163,450 A | 6/1939 | Preble |
| 2,409,421 A | 10/1946 | Dufault |
| 2,835,777 A | 5/1958 | Gates et al. |
| 2,978,972 A | 4/1961 | Hake |

(Continued)

FOREIGN PATENT DOCUMENTS

| DE | 3513909 | 10/1986 |
| DE | 3938951 A1 | 5/1990 |

(Continued)

OTHER PUBLICATIONS

Automotive Heated Seats—Heated Steering Wheels, IGB Automotive Ltd., received by Assignee W.E.T. Automotive Systems, May 2003.

(Continued)

*Primary Examiner* — Dana Ross
*Assistant Examiner* — James Sims, III
(74) *Attorney, Agent, or Firm* — The Dobrusin Law Firm, P.C.

(57) ABSTRACT

The present invention relates to an electrical temperature control for controlling the temperature of surfaces. It is envisaged that the temperature control has at least one heat distribution device which covers at least parts of the surface to be temperature controlled.

17 Claims, 3 Drawing Sheets

(56) References Cited

U.S. PATENT DOCUMENTS

| | | |
|---|---|---|
| 3,165,620 A | 1/1965 | Miller |
| 3,221,145 A | 11/1965 | Hager |
| 3,287,684 A | 11/1966 | Armbruster |
| 3,448,246 A | 6/1969 | Armbruster |
| 3,500,014 A | 3/1970 | Longo |
| 3,721,799 A | 3/1973 | Carlstrom |
| 3,876,844 A | 4/1975 | Scherenberg |
| 3,877,788 A | 4/1975 | Sprague et al. |
| 3,892,946 A | 7/1975 | Rimmi |
| 4,032,752 A | 6/1977 | Ohmura et al. |
| 4,043,544 A | 8/1977 | Ismer |
| 4,044,221 A | 8/1977 | Kuhn |
| 4,072,344 A | 2/1978 | Li |
| 4,149,066 A | 4/1979 | Niibe |
| 4,245,149 A | 1/1981 | Fairlie |
| 4,247,756 A | 1/1981 | Cucinotta et al. |
| 4,335,725 A | 6/1982 | Geldmacher |
| 4,399,347 A | 8/1983 | Schmitt |
| 4,410,790 A | 10/1983 | Berg et al. |
| 4,436,986 A | 3/1984 | Carlson |
| 4,509,792 A | 4/1985 | Wang |
| 4,523,085 A | 6/1985 | Grise |
| 4,533,821 A | 8/1985 | Sato |
| 4,539,051 A | 9/1985 | Hacias |
| 4,542,285 A | 9/1985 | Grise |
| 4,547,655 A | 10/1985 | Kurata et al. |
| 4,549,069 A | 10/1985 | Oge |
| 4,589,656 A | 5/1986 | Baldwin |
| 4,626,664 A | 12/1986 | Grise |
| 4,628,187 A | 12/1986 | Sekiguchi et al. |
| 4,633,068 A | 12/1986 | Grise |
| 4,656,339 A | 4/1987 | Grise |
| 4,661,689 A | 4/1987 | Harrison |
| 4,665,304 A | 5/1987 | Spencer |
| 4,713,531 A | 12/1987 | Fennekels et al. |
| 4,719,335 A | 1/1988 | Batliwalla et al. |
| 4,725,717 A | 2/1988 | Harrison |
| 4,743,741 A | 5/1988 | Ramus |
| 4,752,672 A | 6/1988 | Grise |
| 4,761,541 A | 8/1988 | Batliwalla et al. |
| 4,777,351 A | 10/1988 | Batliwalla et al. |
| 4,777,802 A | 10/1988 | Feher |
| 4,845,343 A | 7/1989 | Aune et al. |
| 4,849,255 A | 7/1989 | Grise et al. |
| 4,857,711 A | 8/1989 | Watts |
| 4,868,898 A | 9/1989 | Seto |
| 4,888,089 A | 12/1989 | Marstiller et al. |
| 4,892,998 A | 1/1990 | Marstiller et al. |
| 4,912,306 A | 3/1990 | Grise et al. |
| 4,923,248 A | 5/1990 | Feher |
| 4,931,627 A | 6/1990 | Watts |
| 4,964,674 A | 10/1990 | Altmann et al. |
| 5,015,824 A | 5/1991 | Monter et al. |
| 5,019,797 A | 5/1991 | Marstiller et al. |
| 5,025,136 A | 6/1991 | Doege et al. |
| 5,034,594 A | 7/1991 | Beezhold et al. |
| 5,045,673 A | 9/1991 | Kelly |
| 5,057,674 A | 10/1991 | Smith-Johannsen |
| 5,081,339 A | 1/1992 | Stine |
| 5,111,025 A | 5/1992 | Barma et al. |
| 5,132,840 A | 7/1992 | Okada et al. |
| 5,155,334 A | 10/1992 | Marstiller et al. |
| 5,160,517 A | 11/1992 | Hicks et al. |
| 5,181,006 A | 1/1993 | Shafe et al. |
| 5,187,350 A | 2/1993 | Tsuchiya |
| 5,197,595 A | 3/1993 | Coultas |
| 5,198,639 A | 3/1993 | Smuckler |
| 5,206,482 A | 4/1993 | Smuckler |
| 5,335,381 A | 8/1994 | Chang |
| 5,344,591 A | 9/1994 | Smuckler |
| 5,354,966 A | 10/1994 | Sperbeck |
| 5,405,178 A | 4/1995 | Weingarten et al. |
| 5,414,241 A | 5/1995 | Oshashi et al. |
| 5,418,025 A | 5/1995 | Harmand et al. |
| 5,422,462 A | 6/1995 | Kishimoto |
| 5,432,322 A | 7/1995 | Ingram et al. |
| 5,451,747 A | 9/1995 | Sullivan et al. |
| 5,477,033 A | 12/1995 | Bergholtz |
| 5,516,189 A | 5/1996 | Ligeras |
| 5,543,601 A | 8/1996 | Bartrug et al. |
| 5,605,643 A | 2/1997 | Reece |
| 5,626,021 A | 5/1997 | Karunasiri et al. |
| 5,643,480 A | 7/1997 | Gustavsson et al. |
| 5,679,277 A | 10/1997 | Niibe et al. |
| 5,702,565 A | 12/1997 | Wu et al. |
| 5,716,536 A | 2/1998 | Yokoto et al. |
| 5,796,044 A | 8/1998 | Cobian et al. |
| 5,800,483 A | 9/1998 | Vought |
| 5,800,595 A | 9/1998 | Wright |
| 5,801,914 A | 9/1998 | Thrash |
| 5,824,993 A | 10/1998 | Chrysochoos et al. |
| 5,824,994 A | 10/1998 | Noda et al. |
| 5,824,996 A | 10/1998 | Kochman et al. |
| 5,847,360 A | 12/1998 | Lorenzen et al. |
| 5,851,588 A | 12/1998 | Uthoff, Jr. |
| 5,861,610 A | 1/1999 | Weiss |
| 5,897,162 A | 4/1999 | Humes et al. |
| 5,902,505 A | 5/1999 | Finley |
| 5,904,874 A | 5/1999 | Winter |
| 5,921,314 A | 7/1999 | Schuller et al. |
| 5,948,297 A | 9/1999 | Haubner et al. |
| 5,961,869 A | 10/1999 | Irgens |
| 6,031,214 A | 2/2000 | Bost et al. |
| 6,054,690 A | 4/2000 | Petit et al. |
| 6,057,530 A | 5/2000 | Gurevich |
| 6,064,037 A | 5/2000 | Weiss et al. |
| 6,068,332 A | 5/2000 | Faust et al. |
| 6,070,115 A | 5/2000 | Oestreicher et al. |
| 6,084,217 A | 7/2000 | Bulgajewski |
| 6,093,908 A | 7/2000 | Haag |
| 6,093,910 A | 7/2000 | McClintock et al. |
| 6,097,009 A | 8/2000 | Cole |
| 6,111,234 A | 8/2000 | Batliwalla et al. |
| 6,124,577 A | 9/2000 | Fristedt |
| 6,143,206 A | 11/2000 | Handa et al. |
| 6,147,332 A | 11/2000 | Holmberg et al. |
| 6,150,642 A | 11/2000 | Weiss et al. |
| 6,164,719 A | 12/2000 | Rauh |
| 6,172,342 B1 | 1/2001 | Khafagy et al. |
| 6,172,344 B1 | 1/2001 | Gordon et al. |
| 6,189,487 B1 | 2/2001 | Owen et al. |
| 6,194,692 B1 | 2/2001 | Oberle |
| 6,215,111 B1 | 4/2001 | Rock et al. |
| 6,220,659 B1 | 4/2001 | McDowell et al. |
| 6,229,123 B1 | 5/2001 | Kochman et al. |
| 6,278,090 B1 | 8/2001 | Fristedt et al. |
| 6,294,758 B1 | 9/2001 | Masao et al. |
| 6,307,188 B1 | 10/2001 | Bulgajewski |
| 6,369,369 B2 | 4/2002 | Kochman et al. |
| 6,392,195 B1 | 5/2002 | Zhao et al. |
| 6,414,270 B1 | 7/2002 | Sugiyama et al. |
| 6,415,501 B1 | 7/2002 | Schlesselman et al. |
| 6,423,951 B1 | 7/2002 | Elsasser |
| 6,426,485 B1 | 7/2002 | Bulgajewski et al. |
| 6,439,658 B1 | 8/2002 | Ganz et al. |
| 6,452,138 B1 | 9/2002 | Kochman et al. |
| 6,455,823 B1 | 9/2002 | Bulgajewski |
| 6,495,809 B2 | 12/2002 | Bulgajewski et al. |
| 6,501,055 B2 | 12/2002 | Rock et al. |
| 6,509,552 B1 | 1/2003 | Roske et al. |
| 6,512,202 B2 | 1/2003 | Haag et al. |
| 6,512,203 B2 | 1/2003 | Jones et al. |
| 6,559,422 B2 | 5/2003 | Burt |
| RE38,128 E | 6/2003 | Gallup et al. |
| 6,619,736 B2 | 9/2003 | Stowe et al. |
| 6,629,724 B2 | 10/2003 | Ekern et al. |
| 6,664,512 B2 | 12/2003 | Horey et al. |
| 6,664,518 B2 | 12/2003 | Fristedt et al. |
| 6,676,207 B2 | 1/2004 | Rauh et al. |
| 6,686,562 B1 | 2/2004 | Weiss et al. |
| 6,710,303 B1 | 3/2004 | Lorenzen |
| 6,713,733 B2 | 3/2004 | Kochman et al. |
| 6,727,467 B1 | 4/2004 | Hadzizukic et al. |
| 6,838,647 B2 | 1/2005 | Nagele |

(56) References Cited

U.S. PATENT DOCUMENTS

| | | |
|---|---|---|
| 6,840,576 B2 | 1/2005 | Ekern et al. |
| 6,857,697 B2 | 2/2005 | Brennan et al. |
| 6,869,139 B2 | 3/2005 | Brennan et al. |
| 6,869,140 B2 | 3/2005 | White et al. |
| 6,872,882 B2 | 3/2005 | Fritz |
| 6,884,965 B2 | 4/2005 | Nelson et al. |
| 6,892,807 B2 | 5/2005 | Fristedt et al. |
| 6,893,086 B2 | 5/2005 | Bajic et al. |
| 6,906,293 B2 | 6/2005 | Schmiz et al. |
| 6,976,734 B2 | 12/2005 | Stoewe |
| 6,977,360 B2 | 12/2005 | Weiss |
| 7,019,260 B1 | 3/2006 | Degand et al. |
| 7,019,261 B2 | 3/2006 | Worrell et al. |
| 7,036,283 B2 | 5/2006 | Halas |
| 7,040,710 B2 | 5/2006 | White et al. |
| 7,052,091 B2 | 5/2006 | Bajic et al. |
| 7,053,344 B1 | 5/2006 | Surjan et al. |
| 7,083,227 B2 | 8/2006 | Brennan et al. |
| 7,100,978 B2 | 9/2006 | Ekern et al. |
| 7,131,689 B2 | 11/2006 | Brennan et al. |
| 7,141,760 B2 | 11/2006 | Howick et al. |
| 7,147,279 B2 | 12/2006 | Bevan et al. |
| 7,154,102 B2 | 12/2006 | Poteet et al. |
| 7,168,758 B2 | 1/2007 | Bevan et al. |
| 7,202,444 B2 | 4/2007 | Bulgajewski |
| 7,205,510 B2 | 4/2007 | Howick |
| 7,213,876 B2 | 5/2007 | Stoewe |
| 7,223,948 B2 | 5/2007 | Howick et al. |
| 7,285,748 B2 | 10/2007 | Nelson et al. |
| 7,301,441 B2 | 11/2007 | Inada et al. |
| 7,306,283 B2 | 12/2007 | Howick et al. |
| 7,338,117 B2 | 3/2008 | Iqbal et al. |
| 7,356,912 B2 | 4/2008 | Iqbal et al. |
| 7,370,911 B2 | 5/2008 | Bajic et al. |
| 7,475,938 B2 | 1/2009 | Stoewe et al. |
| 7,478,869 B2 | 1/2009 | Lazanja et al. |
| 7,500,536 B2 | 3/2009 | Bulgajewski et al. |
| 7,506,938 B2 | 3/2009 | Brennan et al. |
| 7,510,239 B2 | 3/2009 | Stowe |
| 7,560,670 B2 | 7/2009 | Lorenzen et al. |
| 7,569,795 B2 | 8/2009 | Ferguson |
| 7,587,901 B2 | 9/2009 | Petrovski |
| 7,618,089 B2 | 11/2009 | Stoewe et al. |
| 7,637,569 B2 | 12/2009 | Krobok et al. |
| 7,714,256 B2 | 5/2010 | Weiss |
| 7,741,582 B2 | 6/2010 | Howick et al. |
| 7,838,804 B2 | 11/2010 | Krobok |
| 8,015,835 B2 | 9/2011 | Lee et al. |
| D661,793 S | 6/2012 | Spasojevic et al. |
| D661,794 S | 6/2012 | Spasojevic et al. |
| 2002/0117495 A1 | 8/2002 | Kochman et al. |
| 2004/0021346 A1 | 2/2004 | Morinet et al. |
| 2004/0065656 A1 | 4/2004 | Inagawa et al. |
| 2004/0100131 A1 | 5/2004 | Howick et al. |
| 2005/0067862 A1 | 3/2005 | Iqbal et al. |
| 2005/0093347 A1 | 5/2005 | Bajic et al. |
| 2005/0115956 A1 | 6/2005 | Wong |
| 2005/0242081 A1 | 11/2005 | Howick |
| 2006/0015801 A1 | 1/2006 | Suh et al. |
| 2006/0027552 A1 | 2/2006 | Krobok et al. |
| 2006/0138810 A1 | 6/2006 | Knoll et al. |
| 2006/0158011 A1 | 7/2006 | Marlovits et al. |
| 2007/0176471 A1 | 8/2007 | Knoll |
| 2008/0011732 A1 | 1/2008 | Ito et al. |
| 2008/0210048 A1 | 9/2008 | Yoneyama et al. |
| 2009/0026194 A1* | 1/2009 | Bohlender et al. ........... 219/532 |
| 2009/0218855 A1 | 9/2009 | Wolas |
| 2010/0035356 A1 | 2/2010 | Shalyt et al. |
| 2010/0038356 A1 | 2/2010 | Fukuda et al. |
| 2010/0038357 A1 | 2/2010 | Fukuda et al. |
| 2010/0071502 A1* | 3/2010 | Yasuda et al. .................. 74/552 |
| 2010/0219664 A1 | 9/2010 | Howick et al. |
| 2010/0326976 A1 | 12/2010 | Nakajima et al. |
| 2011/0049131 A1 | 3/2011 | Sturgess |
| 2011/0226751 A1 | 9/2011 | Lazanja et al. |
| 2011/0290775 A1 | 12/2011 | Cubon et al. |

FOREIGN PATENT DOCUMENTS

| | | |
|---|---|---|
| DE | 199 20 451 | 12/1999 |
| DE | 10027173 A1 | 12/2001 |
| EP | 0202896 A2 | 5/1986 |
| GB | 2010650 A | 6/1979 |
| JP | 56093284 A | 7/1981 |
| JP | 57134655 A | 8/1982 |
| JP | 62109385 A | 7/1987 |
| JP | 11-24493 A | 1/1999 |
| JP | 11-218336 A | 8/1999 |
| JP | 2000333781 A | 12/2000 |
| JP | 2002050459 A | 2/2002 |
| JP | 2004055219 A | 2/2004 |
| WO | 8906480 A1 | 7/1989 |
| WO | 94/09684 A1 | 5/1994 |
| WO | 9701549 A1 | 1/1997 |
| WO | 01/43507 A1 | 6/2001 |
| WO | 02/06914 A1 | 1/2002 |
| WO | 03101777 | 12/2003 |
| WO | 2005/047056 | 5/2005 |
| WO | 2010/065411 A1 | 6/2010 |
| WO | 2011/149680 A1 | 12/2011 |

OTHER PUBLICATIONS

Automotive Seat Heating Systems, Bauerhin International, received by Assignee W.E.T. Automotive Systems, May 2002.
GMT 830 Heating & Ventilation System, IGB Automotive Ltd., received by Assignee W.E.T. Automotive Systems, Jun. 2003.
Co-pending Patent Application, U.S. Appl. No. 10/715,160, filed Nov. 17, 2003, U.S. Pat. No. 7,306,283.
Co-pending Patent Application, U.S. Appl. No. 11/923,091, filed Oct. 24, 2007, U.S. Pat. No. 7,741,582.
Co-pending Patent Application, U.S. Appl. No. 12/778,238, filed May 12, 2010, published as 2010/0219664.
Related Patent Application, U.S. Appl. No. 13/256,318, filed Sep. 13, 2011 PCT publication No. WO2011/149680.
Related Patent Application, U.S. Appl. No. 13/106,148, filed on May 12, 2011, publishes as 2011/0226751.
Related Design Patent Application, U.S. Appl. No. 29/402,183, filed Sep. 21, 2011, U.S. Pat. No. D661,794.
Related Design Patent Application, U.S. Appl. No. 29/402,182, filed Sep. 21, 2011, U.S. Pat. No. D661,793.

* cited by examiner

HEATING DEVICE FOR COMPLEXLY FORMED SURFACES

CLAIM OF PRIORITY

The present application claims the benefit of the priority of the tiling dates of German Applications DE 10 2011 016 254.2, filed on Apr. 6, 2011; DE 10 2011 102 719.3, filed on May 20, 2011; DE 10 2011 121 147.4, filed on Dec. 15, 2011; DE 10 2011 122 134.8, filed on Dec. 23, 2011; and DE 10 2012 000 977.1, filed on Jan. 20, 2012, the contents of which are hereby incorporated by reference in their entirety.

BACKGROUND

Temperature controls, in particular electrical heating elements and heating conductors, are frequently subjected to high mechanical loads. At the same time, it must be possible to install them quickly and easily.

For that reason, technical solutions are required that can meet either one or several of these requirements appropriately.

SUBJECT

In view of this background, a technical concept with the features of: an electrical temperature control for controlling temperature of surfaces, wherein the electric temperature control has at least one heat distribution device which covers at least parts of a surface to be temperature controlled is proposed. Further advantageous embodiments can be found in the further Claims and the subsequent description. The present teachings further include a method for producing a temperature control comprising the following steps: a) providing a flat carrier and/or a heat distribution device; b) at least partially arranging an adhesive substance on the flat carrier and/or the heat distribution device; c) arranging at least one heater resistor element on the flat carrier and/or the heat distribution device; d) covering the flat carrier and/or the heater resistor element with a further carrier and/or a heat distribution device; e) punching an outer contour of the temperature control.

The invention simplifies particularly the installation of temperature control devices on devices with more complex surfaces.

The invention is suited particularly for use with any curved or contoured surfaces, in particular automobile seats, steering wheels, seat cushions, trim finishes in passenger compartments, armchairs or office equipment, for example, battery heating, aircraft wings, tanks, lines for liquids, gas, and other fluids (e.g. foods, chemicals).

FIGURES

The details of the invention are explained below. These explanations are intended to make it easier to understand the invention. They should only be regarded as examples, however, within the scope of the invention defined by the independent claims, it is obviously also possible to omit, change, or supplement individual or several of the features described. The features of different embodiments can obviously also be combined among one another. What is important is that the concept of the invention is essentially implemented. If one feature must be accomplished at least partially, then this includes moreover that this feature is accomplished completely or is essentially accomplished completely. In this context, "essentially" means in particular that the implementation permits that the desirable benefit is accomplished to an identifiable extent. This can particularly signify that a respective feature is accomplished to the extent of at least 50%, 90%, 95%, or 99%. Where a minimum amount is stated, then obviously also more than this minimum amount can be used. If the quantity of a component is stated to be at least one, then this includes particularly also embodiments with two, three or any other plurality of components. Anything that is described for an object can also be used for the major part or the entirety of all other similar objects. Unless stated otherwise, all intervals also include their end points.

In the following, the Figures show:

DETAILED DESCRIPTION

Figure 1:
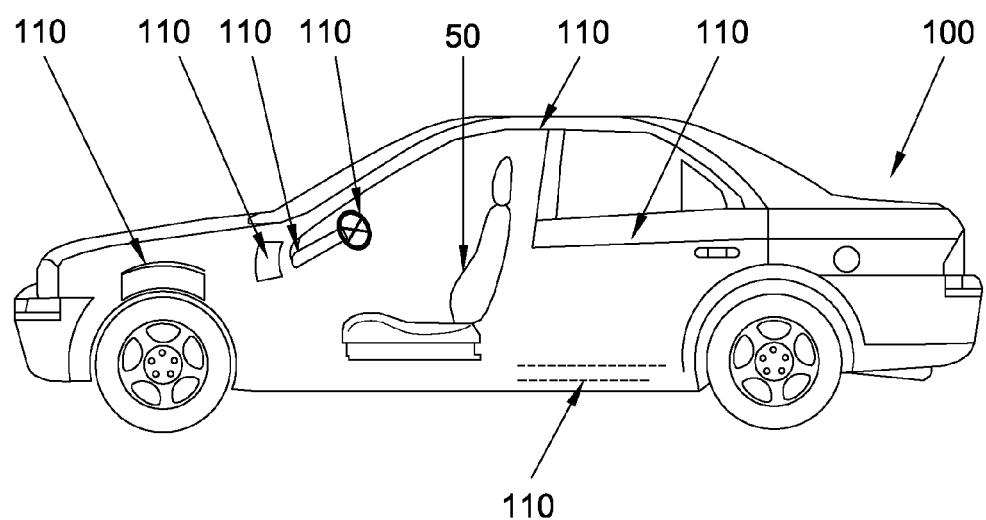
FIG. 1 Is a partial cross-section of an automobile

FIG. 1 shows a vehicle 100. This can involve, for example an aircraft, a railroad car, a ship, or like in this instance, an automobile.

The vehicle 100 has at least one item 110 to be temperature controlled. This particularly involves any components that can be contacted by a user in the passenger compartment, such as a steering gear for vehicles, a steering wheel, an instrument panel, an armrest, door trim, a seat cushion, a thermal blanket, the inside roof lining, padding, a cover, or a seat.

But this can also involve a battery, a fluid line, a mirror, a tank, a reservoir, or similar things.

The item to be temperature controlled 110 will preferably have at least one temperature control 10. A temperature control is defined as any unit that can be specifically used to change the temperature in its environment, e.g. any devices with at least one electrical heater resistor, a heat pump, a Peltier element and/or air moving means, such as a blower.

Figure 2:
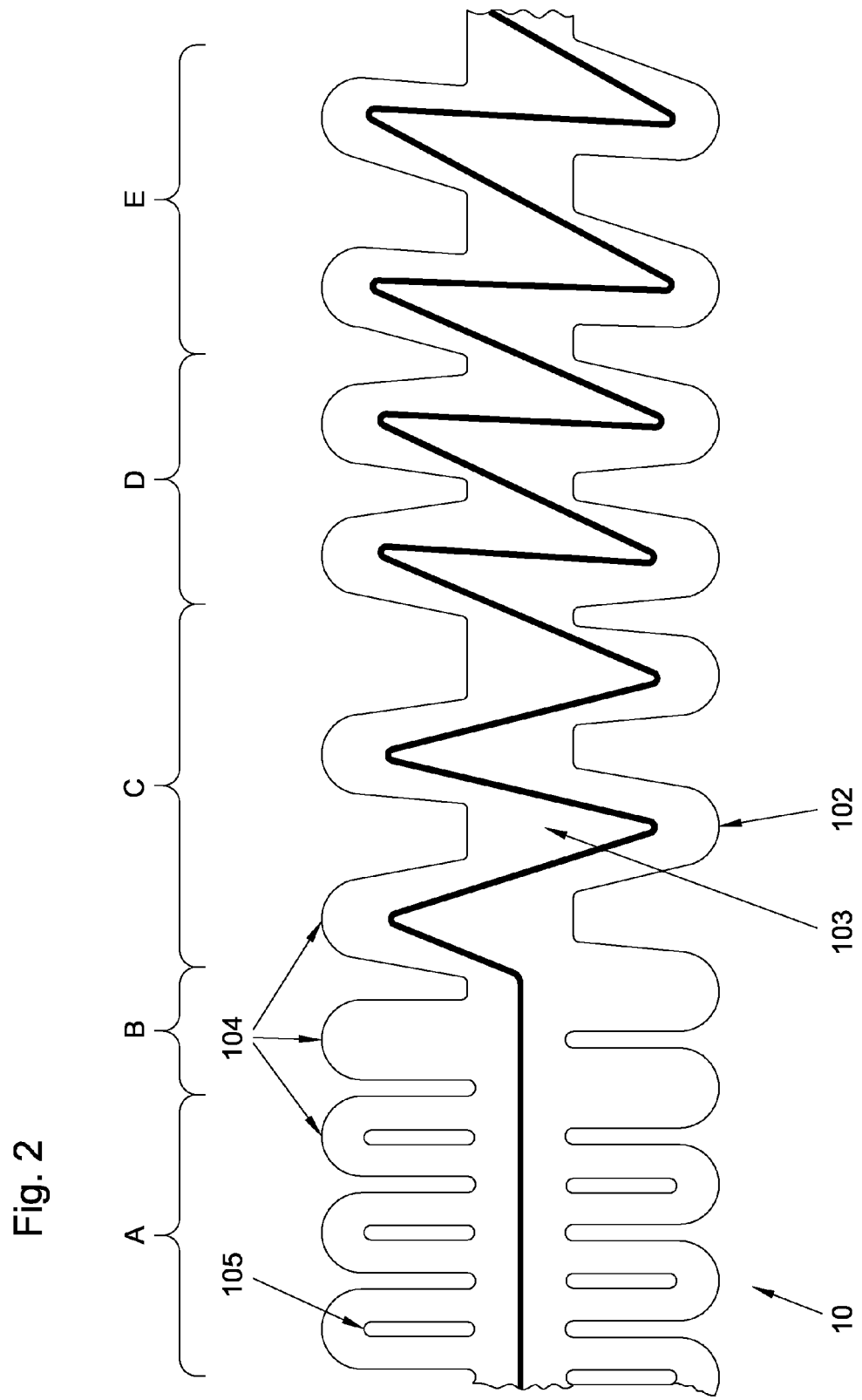
FIG. 2 Is a horizontal projection onto an electrical flat temperature control with a heater resistor element and a heat distribution device FIG. 3 Is a cross-section through a steering gear with a temperature control according to FIG. 2.
Figure 3:
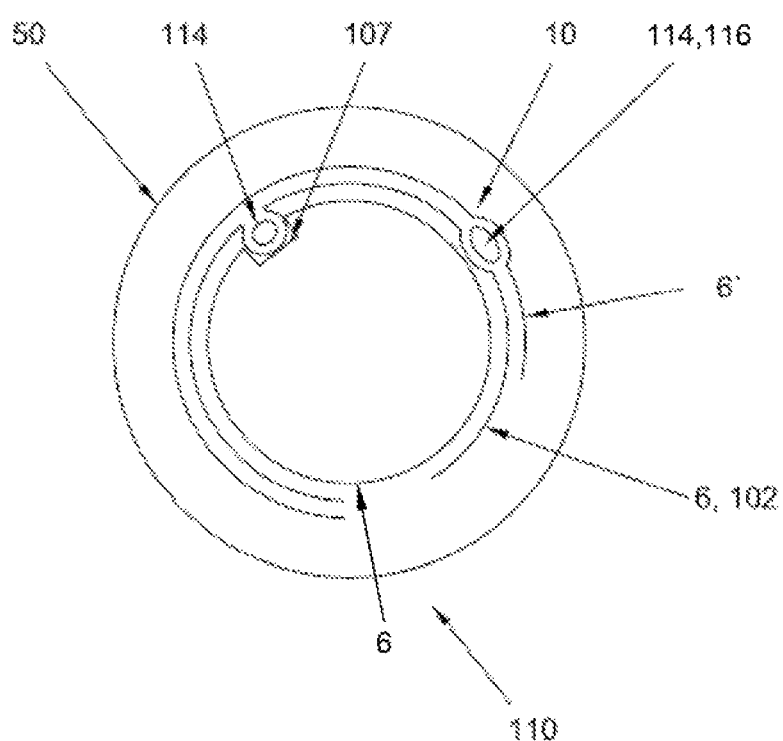

FIG. 2 shows an embodiment of a temperature control 10. Here, it is designed as a flat, flexible heating element. The temperature control 10 can be integrated as an insert in the padding of an interior trim item, such as a seat or a steering wheel.

The temperature control 10 and/or the item to be temperature controlled 110 has at least one carrier 102. This should preferably be flat and be at least partially made of textile, fabric, knitted fabric, woven material, nonwoven fabric, flexible thermoplastics, air-permeable material and/or punched or napped sheeting. A textile is a flat entity made of filaments or fibers.

Preferably, at least one carrier 102 has a tape-like core section 103. A plurality of blade sections 104 is arranged on the core section 103. These are preferably formed as one piece with the core section. They can also be added subsequently, however. The blade sections 104 are preferably arranged in the same plane as the core section 103, but they can also be arranged in a plane that runs parallel thereto, however. A stabilizing center ridge facilitates easy operation of the temperature control 10. This moreover permits a heater resistor element 114 to be supported, even if same is curved.

The blade sections 104 can all be arranged on the same side of the core section 103. This permits easier assembly, since all blade sections 104 can be removed in the same direction. The core section 103 is preferably provided with blade sections 104 on both of its longitudinal edges, however. Preferably, several blade sections 104 are provided in at least one section A, B, C of the carrier 102 in an alternating configuration. This particularly means an asymmetric configuration with respect to the longitudinal axis of the core section 103. A configuration of the tips of the blade sections 104 and/or the attachment points of the blade sections 104 which is alternately offset is particularly suitable, for example.

The core section 103 has at least one section D, E, in which at least one part of the blade sections 104 is configured opposite.

An opposite configuration means in particular that the blade sections 104 are arranged symmetrical at least in sections on the core section 103 of the carrier 102. Particularly suitable is a reciprocal symmetrical configuration of attachment points or tips 104 of blade sections, for example. This permits adequate cover in a steering wheel web area, for example.

Preferably, at least one blade section 104 has a cutout 105. This is preferably located in a central area of the blade section 104. This permits the blade section 104 to be bent around a bend axis even if a core section 103 is bent around a further bend axis, without creasing.

Preferably the carrier 102 consists at least partially of a material which has pores, mesh openings, perforations, or similar things. This accomplishes low weight, good thermal transmittance, and at the same time high tensile strength of the carrier 102. Perforated sheeting or reticulated textile fabrics are particularly suitable.

The carrier 102 is made preferably, at least in sections, of an electrically insulating material. This permits the use of non-insulated heater resistor elements and economical materials.

The temperature control 10 in particular has at least one heater resistor element 114 that is arranged at, on and/or in the carrier 102. Preferably, a multicore heater resistor element 114 is provided in the form of a heating section where the cores are preferably arranged reciprocally twisted and electrically parallel. At least one heater resistor element 114 is attached on carrier 102 partially or across the entire surface with an adhesive, for example. The heater resistor element 114 has an electrical resistance of between 100 Ω/m and 1000 Ω/m, better 100 and 800 Ω/m, better 300 and 500 Ω/m. The heater resistor element is preferably formed at least pro rata from a material with PTC characteristics. This will preferably involve stranded wire. If the heater resistor element forms a conductor loop or phase winding with an outgoing lead and a return wire which are short-circuited on their one end, then the heater resistor element will require a contact only on a single position of the steering wheel.

The heater resistor element 114 is preferably arranged at least in sections along the central axis of the carrier 102. This aims at using as little material as possible and to have minimum mechanical deformation.

The heater resistor element 114 is preferably arranged meandering. Preferably it also extends at least in sections into the blade sections 104. Preferably it is arranged so that the distance to the edge of the carrier 102 is constant. It therefore follows the outside contour of the carrier 102 at least in sections. This is useful with an alternating configuration of the blade sections 104, for example. Here, it is possible that the meandering course of the heater resistor element 114 is harmonically congruent with the alternating configuration of the blade sections 104. The heater resistor element 114 can also be arranged at least in sections such that it does not follow the outside contour of the carrier 102. This can be useful with an alternating configuration of the blade sections 104, for example, so that all blade sections 104 are covered with one heating section.

It can be provided that at least two heater resistor elements 114 are arranged on the carrier 102. This will achieve increased reliability, the supply of respectively one of the two edge sections of the temperature control element with one inherent heater resistor element 114 and a varying temperature control in different zones by means of individual adjustment of the heating capacity in a specific zone.

It can be provided that at least two heater resistor elements 114 are arranged reciprocally parallel along the core section 103 of the carrier 102.

The temperature control 10 preferably has at least one flat heat distribution device 6. For this purpose, particularly layers with metallic constituents, such as aluminum, foils or sheets are suitable. Preferably, one heat distribution device 6, 6' each is arranged on the upper and the underside of the heater resistor element 114, such as in the form of a heat conducting layer, such as from aluminum foil, in the thickness between 0.01 and 0.5 mm, for example, preferably from 0.1 to 0.2 mm. The distribution devices 6 protrude beyond the heater resistor element 114 and are attached to each other in projecting areas with an adhesive or an adhesive tape, for example. This results in an especially good heat transfer from the heater resistor element to the heat distribution devices 6.

Preferably at least one heat distribution device 6 has a tape-like core section 103'. A plurality of blade sections 104' is arranged on the core section 103'. These are preferably formed as one piece with the core section 103'. They can also be adjoined subsequently, however. The blade sections 104' are preferably arranged in the same plane as the core section 103', but they can also be arranged in a plane that runs parallel thereto, however. This permits easy operation of the heating element by means of a stabilizing center ridge.

The blade sections 104' can all be arranged on the same side of the core section 103'. The core section 103' is preferably provided with blade sections 104' on both of its longitudinal edges, however. This permits improved heat distribution because of the smaller distance between the heater resistor element 114 and a tip of a blade section 104'.

In other respects, the previous comments made with respect to the carrier are applicable analogously for the structure of the heat distribution device 6, 6'.

The heat distribution device 6 is preferably made at least partially of a material which has good thermal conductance. Perforated sheeting or reticulated textile fabrics are particularly suitable:

Preferably at least one heat distribution device 6 is connected to ground, in order to shield against electromagnetic fields and provide users additional protection in the event of electrical circuit faults.

Preferably at least one heat distribution device 6 is arranged identical with the carrier 102 or congruent with it. All heat distribution devices 6 are preferably arranged reciprocally congruent. Advantageously, at least one textile carrier and at least one metallic heat distribution device with at least one embedded heating conductor in between form a sandwich, wherein the textile carrier is arranged closer to the surface to be temperature controlled than the heat distribution device, in order to achieve a cushioning effect. But it can also be provided, that the textile carrier points to the steering wheel core and the heat distribution device points to the surface of the steering wheel, to accomplish improved heat transfer to the steering wheel surface. To ensure high haptic comfort it is also possible to arrange a heat distribution device between two textile layers or two carriers 102.

It can be provided that one heat distribution device 6' has at least one blade section 104' where its distance from the central axis of the blade section 104' is shorter than that of at least one second heat distribution device 6 which is arranged congruent with respect to its longitudinal axis. This permits material savings while at the same time having sufficient thermal exchange with areas at a distance from the heater resistor elements 114.

For logical reasons, the temperature control 10 has a temperature sensor which interrupts the current supply to at least part of the heater resistor elements 114 when the temperature exceeds 60° C., for example. The temperature sensor can be a thermostat, for example. In addition or as an alternative to the heater resistor element 114, one or several Peltier elements can be provided which assist in cooling the heat distribution device 6.

The temperature control 10 preferably has at least one heat distribution device 6, which encloses at least sections of heater resistor element 114 and at least in sections and does so at least partially. When looking at a cross-section, preferably at least 50% of the circumference of the heater resistor element 114 of the heat distribution device 6 is enclosed, preferably particularly 70%, preferably 90%.

A heater resistor element 114 is arranged preferably between at least two heat distribution devices 6, 6'. Because of the large contact area, this results in a high heat transfer between the heater resistor element 114 and the heat distribution devices 6, 6'. Preferably at least one insulation is arranged between the heater resistor element 114 and at least one heat distribution device 6. This can be provided as an insulation coating on the heater resistor element 114, for example. Also at least one heat distribution device 6, 6' can be coated with an insulation layer. Preferably, at least two heat distribution devices 6, 6' are connected to each other with at least one bonding material that is arranged in between them. Double-sided adhesive tapes or spray adhesives are particularly suitable.

It can also be provided that at least two heat distribution devices 6, 6' are connected to each other non-positively and/or positively, at least in sections. This can have been done by means of embossing of knops and cutouts or by reciprocal compression. In such areas it can be advantageous if no adhesive is used, especially when high temperatures are present there.

The temperature control 10 is preferably produced using the following steps:
a) Provision of a flat carrier 102 and/or a heat distribution device 6.
b) At least the partial arrangement of an adhesive substance on the carrier 102/ of the heat distribution device 6.
c) Arranging at least one heater resistor element 114 on the carrier 102.
d) Covering the heater resistor element 114 with a further carrier 102 and/or a heat distribution device 6.
e) Punching of the outer contour of the temperature control 10.

But it is also possible to interchange the production steps and to install the heater resistor elements 114 on the carrier 102, for example, the outer contour of which has already been trimmed.

The temperature control 10 can now be arranged so that the surface to be heated is brought up to temperature as uniformly as possible. For this purpose it can be advantageous that the surface be contoured such that a heater resistor element 114, a heat distribution device, a flat carrier or other components with a greater thickness can be flush-mounted into corresponding recesses 107 to achieve a uniform surface contour of a cover 50, for example. Preferably the depth and width of such recesses 107 are sized a little bit larger than the respective thickness and width dimensions of the components to be flush-mounted.

During heating or cooling, it is not necessary for the entire surface to be temperature controlled and to be covered with a heater resistor element 114 or cooling element. It is rather feasible to do the respective heating/cooling at suitable positions and to apply the heat fed into or taken out of the heat distribution device 6 uniformly onto the surface to be temperature controlled via the heat distribution device 6.

LIST OF REFERENCE SYMBOLS 6, 6' Heat distribution device
10 Temperature control
50 Cover
100 Vehicle
102 Carrier
103, 103' Core section
104, 104' Blade section
105 Cutout
107 Recess
110 Item to be temperature controlled
114 Heater resistor element
116 Cooling element

The invention claimed is:

1. An electric temperature control device for controlling a temperature of a surface, the temperature control device comprising:
   at least one heat distribution device covering at least part of the surface to be temperature controlled, the at least one heat distribution device having metal layers,
   at lease one carrier comprising:
      i. an elongated tape-like core section extending along a longitudinal axis,
      ii. a plurality of blade sections, each of the blade sections are projections that project and extend from opposing longitudinal edges of the core section, and
      iii. at least one heater resistor element,
   wherein the at least one heater resistor element is arranged between two flexible metal layers of the heat distribution device that project at least partially beyond sides of the at least one heater resistor element to cover a larger area than a base area of the at least one heater resistor element,
   wherein in a first portion of the core section, the at least one heater resistor element extends generally along the longitudinal axis and is free from extending into the blade sections, and in a second portion of the core section, the at least one heater resistor element extends into the blade sections, and
   wherein the at least one heater resistor element is a standard wire that forms a conductor loop, phase winding, or both with an outgoing lead and a return wire.

2. The electric temperature control device according to claim 1, wherein at least one blade section of the plurality of blade sections has a cutout.

3. The electric temperature control device according to claim 2, wherein the at least one carrier is comprised at least partially of a material which has pores, mesh openings, perforations, the like, or a combination thereof.

4. The electric temperature control device according to claim 3, wherein the at least one heat distribution device is arranged between two textile layers or two carriers.

5. The electric temperature control device according to claim 4, wherein the electric temperature control is integrated as a: insert into padding of a seat or a steering wheel.

6. The electric temperature control device according to claim 1, wherein the electric temperature control device has at least one electrical cooling element.

7. The electric temperature control device according to claim 1, wherein the electric temperature control device includes a heat pump, a Peltier element, an air moving means, or a combination thereof.

8. The electric temperature control device according to claim 1, wherein the at least one carrier is comprised at least partially of a material which has pores, mesh openings, perforations, the like, or a combination thereof.

9. The electric temperature control device according to claim 1, wherein the at least one heat distribution device is arranged between two textile layers or two carriers.

10. The electric temperature control device according to claim 1, wherein the electric temperature control device is integrated as art insert into padding of a seat.

11. The electric temperature control device according to claim 1, wherein the plurality of blade sections are arranged in asymmetrical sections relative to a longitudinal axis of the at least one carrier.

12. The electric temperature control device according to claim 1, wherein the plurality of blade sections are arranged in sections relative to the longitudinal axis of the at least one carrier,
wherein at least some of the sections are symmetrically arranged relative to the longitudinal axis and at least some of the sections are asymmetrically arranged relative to the longitudinal axis.

13. The electric temperature control device according to claim 1, wherein the at least one heater resistor element has an electrical resistance between 100 Ω/m and 1000 Ω/m.

14. An electrical temperature control device for controlling a temperature of a surface comprising:
a carrier core extending along a longitudinal carrier axis, the carrier core having a plurality of carrier blade sections, each of the carrier blade sections are projections that project and laterally extend from opposing edges of the carrier core relative to the carrier axis, the carrier blade sections are arranged in carrier sections on the opposing edges of the carrier core that are asymmetric, symmetric, or a combination of both about the carrier axis,
at least one heater resistor element arranged on the carrier core, and
a heat distribution device arranged on an upper side of the at least one heater resistor element, an underside of the at least one heater resistor element, or both, the heat distribution device protrudes beyond the at least one heater resistor element, the heat distribution device includes a distribution core extending along a distribution axis with distribution blade sections that are projections laterally extending from opposing edges of the distribution core relative to the distribution axis, the distribution blade sections are arranged in distribution sections on opposing edges of the distribution device that are asymmetric, symmetric, or a combination of both about the distribution axis,
wherein at least some of the carrier blade sections have a cutout, and at least some of the carrier blade sections are free of a cutout,
wherein in at least one area of the carrier core, the at least one heater resistor element extends into one or more of the carrier blade sections that are free of a cutout and the at least one heater resistor element is generally free from extending along the carrier axis,
wherein in at least one other area of the carrier core, the at least one heater resistor element is arranged generally along the carrier axis and the at least one heater resistor element does not extend into one or more of the carrier blade sections that have the cutout, and
wherein the at least one heater resistor element is a standard wire that forms a conductor loop, phase winding, or both with an outgoing lead and a return wire which are short-circuited on their one end.

15. The electrical temperature control device of claim 14, wherein the electrical temperature control device has at least one electrical cooling element assisting in cooling the heat distribution device.

16. The electrical temperature control device of claim 14, wherein the carrier core and the heat distribution device include at least one heater resistor element therebetween forming a sandwich.

17. The electrical temperature control device of claim 14, wherein the carrier core and the heat distribution device include at least one heater resistor element therebetween forming a sandwich,
wherein the heat distribution device is arranged closer to the surface to be temperature controlled than the carrier core.

* * * * *

UNITED STATES PATENT AND TRADEMARK OFFICE
CERTIFICATE OF CORRECTION

PATENT NO. : 9,468,045 B2
APPLICATION NO. : 13/432210
DATED : October 11, 2016
INVENTOR(S) : Zhang et al.

Page 1 of 1

It is certified that error appears in the above-identified patent and that said Letters Patent is hereby corrected as shown below:

In the Claims

Column 7, Claim 10, Line 3, should read ""as an insert"", instead of "as art insert".

Signed and Sealed this
Twenty-fifth Day of April, 2017

Michelle K. Lee
*Director of the United States Patent and Trademark Office*